Patented Mar. 29, 1927.

1,622,304

UNITED STATES PATENT OFFICE.

CHESTER M. ANGELL, OF CHICAGO, ILLINOIS, ASSIGNOR TO VESTA BATTERY CORPORATION, OF CHICAGO, ILLINOIS, A CORPORATION OF ILLINOIS.

PROCESS OF MANUFACTURING STORAGE BATTERIES.

No Drawing.  Application filed November 5, 1923. Serial No. 672,990.

This invention relates to processes of manufacturing storage batteries.

The usual method of making storage batteries is to take the freshly pasted plates, thoroughly dry them in special racks, either by hot or cold air, then assemble the dried unformed plates in special groups and place them in special forming jars or tanks with a relatively weak sulphuric acid called forming solution, passing an electric current through the plates until the paste in the positive and negative plates, called active material, has been converted to lead peroxide and spongy lead, respectively. After these steps the plates are taken out of the forming acid, disassembled and dried and then usually stacked up as a stock of formed positive and negative plates, respectively. Thereafter they are ready to be burned up into groups and made into cells with the wet wood separators placed betwen the plates. The cells, in turn, are assembled and finished into batteries and acid is added, of such strength that the gravity in each cell after a developing or finishing charge is about 1.280°.

In contradistinction to this usual method and other methods more or less similar thereto, I propose the following:
The battery grids are pasted by hand or by machine in the usual way. The surfaces of the pasted plates are then preferably pressed and sufficiently dried by means of blotting paper or a special paper in rolls so that these plates can be handled immediately in the damp condition and piled up in stacks or in rows and not stick to each other. This stops the rapid drying of the plates and the development of shrinkage cracks in the active material.

While this is one way of handling the wet freshly pasted plates there are several other ways that the same results might be accomplished. The wet plates might be piled with blotters or pasting paper between them or some mechanical conveying system running in humified air might handle them so expeditiously that they had no chance to dry or stick to each other. I find that the wetter the paste the greater the porosity and therefore electrical capacity in the finished plate. At the same time the wetter the paste is the greater the danger from shrinkage cracks, should the plates dry. Therefore any method that will allow the convenient handling of these freshly pasted plates and the necessary operations as cutting cleaning and stocking these plates between processes or departments without allowing them to dry, I propose to use.

At this point it is well to state that I find the wet unformed plates are much more pliable and will stand more handling and abuse without damage to the active material than the same plate in the dried condition.

As small stocks of plates are accumulated I either cut them in two, if they are double plates and pile them up again and then use them, or if they are single plates I burn them up into finished groups of positive and negative plates directly. This burning operation should be done as quickly as possible and the necessary number of wet wood separators placed in position between the plates immediately and the assembled elements put into their respective jars. The covers are put on and sealed in place. After the plates are in this inclosed condition the drying is retarded so that a reasonable time can elapse in the further steps of connecting the cells and adding the weak forming acid and placing the batteries on charge.

Thus wet unformed plates are handled, piled and cut without injurious drying or shrinkage or other damage and then assembled and made into finished batteries. These features characterize the novelty of the process.

The forming acid is poured into the completely assembled batteries and the freshly pasted plates are subjected to the action of the electric current while in their final position. In fact, the forming, developing and final charging take place in the otherwise finished battery and not in separate departments of the factory, as was heretofore the practice.

The process described results in a considerable saving in points of time, labor and current. The unformed plates need not be dried and then assembled in temporary groups and then again disassembled and dried again before they are ready for use in a group in a finished battery. The drying of a formed negative causes it to oxidize and heat and it thereby loses a considerable part of its charge.

To make sure that the positive or negative plates will not be overformed or underformed in the application of this process, it is necessary to carefully balance the mixture of red lead and litharge in the unformed plates so that the positive and negative plates for a given size of finished battery will both reach the end of the forming operation at the same time.

After the forming action is completed, the forming acid is dumped out and replaced by the usual stronger electrolyte. The final charge is given for a relatively short period, much less time being required for this final developing charge than was necessary in the processes heretofore in vogue, since the plates do not become dried, oxidized or sulfated but remain wet and fully charged after the forming charge.

I am aware that battery plates have been pasted and formed wet and then dried and assembled in groups to make finished batteries. I am also aware of attempts that have been made to use wet-formed plates in finished batteries, but, due to the fact that negatives heat so rapidly and that the wet acid-soaked plates are difficult to handle, this has not proved practical.

What I claim as my invention is:

1. In a process of making storage batteries, the steps which consist in drying the surfaces of freshly pasted plates, then burning the plates into groups in which the plates assume their final structural relation of positive and negative plates respectively, then assembling such groups of positive and negative plates in their usual relation and forming the assemblies in the otherwise finished battery.

2. In a process of making storage batteries, the steps which consist in removing an excess of liquid from the freshly pasted plates to the extent that sticking together of superposed plates is prevented, placing the plates in piles, then burning the positive and negative plates respectively while still relatively wet, into separate groups in which the plates assume their final structural relation of positive and negative plates respectively, then assembling such groups of positive and negative plates in their usual relation, forming the assemblies in the otherwise finished battery, removing the forming acid and subjecting the assemblies to a final charge in a stronger electrolyte.

In testimony whereof, I affix my signature.

CHESTER M. ANGELL.